June 7, 1949.                S. H. EDWARDS                 2,472,525
                      FLUID PRESSURE OPERATED VALVE
Filed June 27, 1945                                    2 Sheets-Sheet 1
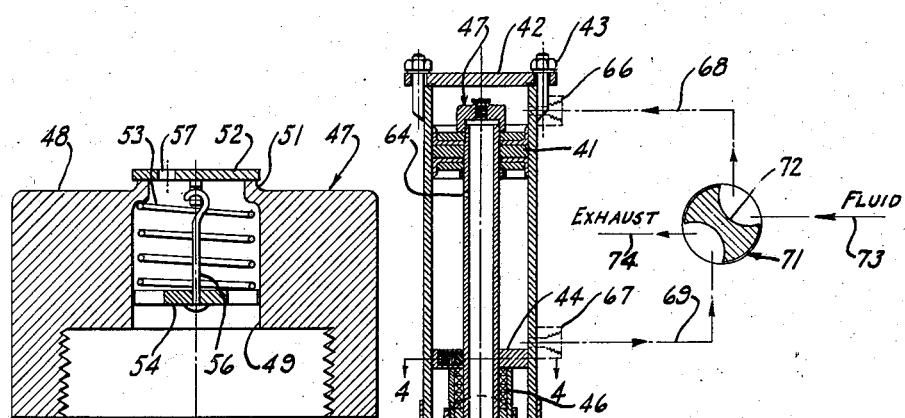
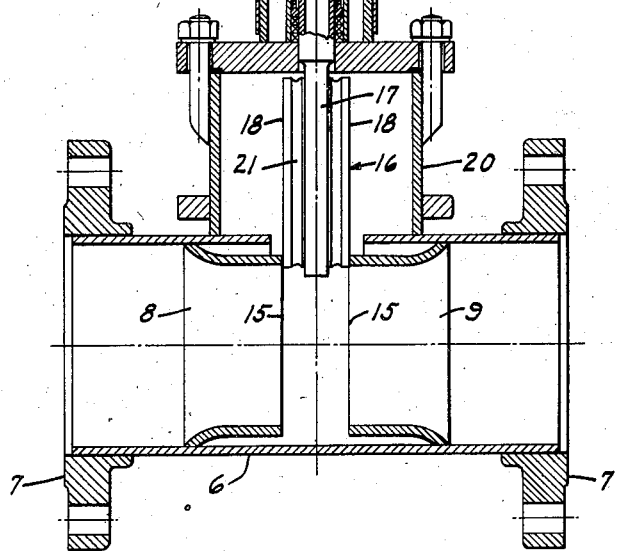
FIG.1
FIG.2
INVENTOR
SAMUEL H. EDWARDS
BY
ATTORNEY June 7, 1949. S. H. EDWARDS 2,472,525
FLUID PRESSURE OPERATED VALVE
Filed June 27, 1945 2 Sheets-Sheet 2
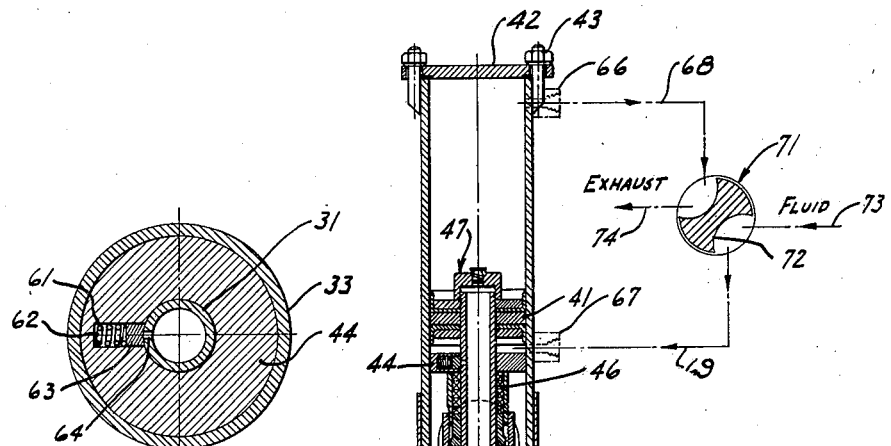
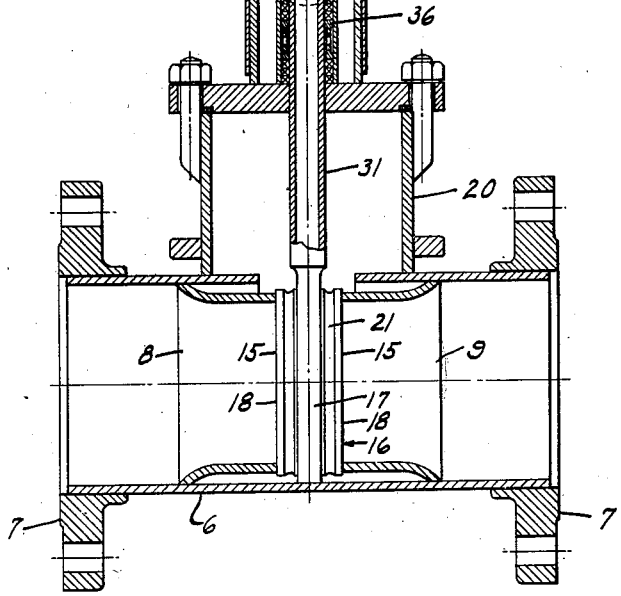
INVENTOR
SAMUEL H. EDWARDS
BY
ATTORNEY Patented June 7, 1949

2,472,525

UNITED STATES PATENT OFFICE 2,472,525

FLUID PRESSURE OPERATED VALVE

Samuel H. Edwards, Richmond, Calif.

Application June 27, 1945, Serial No. 601,773

9 Claims. (Cl. 137—139)

This is a continuation in part of my application Serial No. 509,971, filed November 12, 1943.

This invention relates to a valve and particularly to a novel valve construction which enables a tight shut-off to be established on both the upstream and the downstream side of the valve upon application to the valve of a fluid under pressure. This is a feature of considerable advantage. For example, in cyclic catalytic reforming plants it is necessary to cut off fluid flow positively, for slight leaks from either side of the valve to the other side, or from either side of the valve to the atmosphere, are extremely hazardous. The valve of the present invention also enables a tight shut-off to be established even though the valve is under mechanical strain or if one side of the valve is at a materially different temperature from the other side. Since the valve is fluid operated it can be operated from a distance by an operator manipulating a valve.

Briefly, the valve of the present invention includes the usual valve body. Valve seats are provided in this body on the upstream and downstream sides. A gate is movable across these seats to control flow of fluid. The gate structure is novel in that it includes two seating members, one for each valve seat, although only one need be employed for certain uses. The seating members are carried upon the gate by flexible bellows; when a fluid under pressure is admitted to the interior of the gate, the movable seating members are moved positively to engage the seats. The gate is moved across the valve seats from an open to a closed position upon fluid pressure application to a piston in a cylinder. When the gate is in closed position, the fluid pressure expands the seating member and forces each seating member against its seat. Preferably the pressure created is greater than that ever likely to be present in the line so the valve provides a position closure. Admission of the fluid to expand the gate can only occur when the gate is in its lowermost position. This feature is desirable to insure that the expandable gate is not damaged by expansion prior to lowering of the gate into its closed position. It will be obvious that the operating force required to open the valve is very little, particularly if the valve is under pressure from a fluid in the line. When it is desired to open the valve, the fluid pressure is applied to the other side of the piston. However, before the gate is raised, the fluid pressure in the seating member is released so the seating member is retracted and is out of the way so the gate can be raised.

It is the general broad object of the present invention to provide a novel, fluid-operated expanding gate valve.

A further object of the present invention is to provide a simple, rugged gate valve structure which can be raised and lowered and expanded and contracted by a fluid in cooperation with a suitable valve body and valve seat.

A further object of the invention is to provide a novel gate valve operator for lowering a gate and expanding the gate when lowered.

The invention includes other objects and features of advantage, some of which, together with the foregoing, will appear hereinafter wherein the present preferred form of valve structure of this invention is disclosed.

In the drawing accompanying and forming a part hereof, Figures 1 and 3 are sections taken through the valve body, the figures respectively illustrating the valve in open and closed position.

Figure 2 is an enlarged section of a valve provided at the end of the valve stem. Figure 4 is an enlarged section along the line 4—4 of Figure 1.

Referring to the drawings, numeral 6 indicates a valve body having flanges 7 thereon enabling the body to be installed in a pipe line. Valve seats 8 and 9 are provided in the valve body, these being inserted and welded in place. Each valve seat has a seating portion 15 formed thereon. I prefer that these seating portions be parallel to each other; if desired they can be at a slight angle to each other to provide a wedge shaped receptacle for the gate generally indicated at 16. In this last case, the wedge opens toward the top of the valve, the smallest side of the wedge being adjacent the bottom of the valve.

The valve gate is a composite structure made up of a central annular member 17 and two flat plates 18 having faces thereon to engage the valve seat faces 15. Each plate is movably joined to the central annular member 17 by a flexible connection provided by a flexible metal annulus 21 joined to the peripheral edge of each plate 18 and to the annulus 17. A fluid passage (not shown) extends through the annulus 17 to permit fluid to be admitted and withdrawn to the fluid-tight chamber formed by plates 18, the flexible annuli 21 and the central annulus 17. If desired, one of the plates 18 can be omitted; in this case, positive pressure sealing, however, is only provided on one side of the valve.

To raise and lower the gate 16 a suitable hollow valve stem 31 is secured to the gate 16. The valve stem 31 extends upwardly through bonnet 29 secured to valve body 6 and through a bonnet extension 33 secured to the bonnet, the bonnet and the extension being of sufficient height to permit full opening of the gate valve. A packing gland indicated generally at 36 is provided in the bonnet extension about the valve stem as it issues from the bonnet; the bonnet extension is apertured as at 24 to enable the gland to be repacked or tightened.

The upper end of the bonnet extension provides a cylinder cooperating with piston 41 secured on the end of the valve stem 31. The bonnet extension is closed at its upper end by plate 42 held in place by studs 43, while plate 44 closes the extension at an intermediate point and completes the cylinder. A packing gland 46 is provided about the valve stem below the cylinder. Mounted on an end of the valve stem is a valve structure generally indicated by numeral 47. This includes a valve body 48 with a central passage 49 and a valve seat 51. A valve disc 52 seats on the valve seat. The valve disc is held on the seat by a spring 53 placed in passage 49 between keeper 54 and valve seat 51, rod 56 connecting the keeper and the disc. The valve disc 52 has a small aperture 57 therein.

The plate 44 (Figure 4) includes an aperture 61 in which a spring 62 is mounted to urge valve member 63 against the valve stem and close aperture 64 in one position of the stem. Fluid ports 66 and 67, provided on each side of the piston, are connected by lines 68 and 69 to a suitable valve such as that indicated at 71 and including a valve member 72. Fluid is admitted to the valve through line 73 and exhausted through line 74.

In operation, with the valve 71 in the position shown in Figure 1, fluid under pressure is admitted to the upper side of the piston to force the valve gate into closed position. However, the aperture 57 in the valve disc and aperture 64 permit fluid to leak past and find its way to the exhaust through port 67, line 69 and valve 71. When the gate is in closed position, aperture 64 is sealed by member 63 and the fluid pressure is then applied to the gate to expand it and force the plates 18 to engage the seats 15.

When valve 71 is turned 90°, the fluid pressure is applied to the other side of the piston (Figure 3). Release of the seating engagement of plates 18 before the gate is raised is ensured by operation of valve 47, the valve disc 52 being lifted off its seat by the expanding fluid to permit the fluid in the chamber to expand quickly when the pressure is released and before the valve gate is raised.

The lines 68 and 69 can be of any desired length while valve 71 can be any suitable structure.

I claim:

1. A valve of the character described comprising a valve body, a valve seat therein, a valve gate, a hollow valve stem supporting said gate, a seat engaging member movably mounted on said gate, a piston on said valve stem, said gate having a passage therein for fluid from said stem to move said member to engage said seat, a cylinder cooperatively positioned with respect to said piston, and in fluid communication with said valve stem on one side of said piston, a first port in said cylinder on one side of said piston, a second port in said cylinder on the other side of said piston, said valve stem having an opening to said one side of said piston, and a fluid control valve for controlling fluid communication between said valve stem and said cylinder.

2. A valve of the character described comprising a valve body, a valve seat therein, a valve gate, a hollow valve stem supporting said gate, a seat engaging member movably mounted on said gate, a piston on said valve stem, said gate having a passage therein for fluid from said stem to move said member to engage said seat, a cylinder cooperatively positioned with respect to said piston, a first port in said cylinder on one side of said piston, and a second port in said cylinder on the other side of said piston, said valve stem having a first opening to said one side of said piston and a second opening to said other side of said piston, and means for sealing said second opening when said valve member is opposite said valve seat.

3. A valve of the character described comprising a valve body, a valve seat therein, a valve gate, a hollow valve stem supporting said gate, a seat engaging member movably mounted on said gate, a piston on said valve stem, said gate having a passage therein for fluid from said stem to move said member to engage said seat, a cylinder cooperatively positioned with respect to said piston, a first port in said cylinder on one side of said piston, and a second port in said cylinder on the other side of said piston, said valve stem having a first opening to said one side of said piston, a second opening to said other side of said piston, and means for sealing said second opening when said valve member is opposite said valve seat, said first port admitting fluid pressure to said one side of said piston to force said piston to move said gate until said member is opposite said seat and said second opening is closed and said member is moved to engage said seat, and a valve member on said valve stem for releasing fluid from said passage upon release of said fluid pressure.

4. A valve of the character described comprising a gate valve having a fluid chamber therein to move a gate member toward and away from a valve seat, a cylinder, a piston in said cylinder, a valve stem connecting said gate valve with said piston, means for applying a fluid to one side of said piston to move said gate toward said valve seat and, when said gate is opposite said seat, to said fluid chamber, and means for releasing fluid from said chamber immediately upon application of pressure to the other side of said piston to release said gate member from said valve seat before said gate is moved away from said seat.

5. A valve of the character described comprising a gate valve having a fluid chamber therein to move a gate member toward and away from a valve seat, a cylinder, a piston in said cylinder and a hollow valve stem carrying said piston and connecting said chamber and said cylinder on one side of said piston, means for applying fluid pressure to said cylinder on the one side of said piston, a by-pass about the other side of said piston and connected with said hollow valve stem, and means for closing the by-pass when the gate member is in valve seat engaging position to apply the fluid pressure to the fluid chamber through said valve stem and move the gate member into engagement with the valve seat.

6. A valve of the character described comprising a gate valve having a seat and a valve gate movable into and out of a seating position with respect to said seat, a cylinder, a piston in said cylinder, means connecting said piston to said valve gate to move said gate toward and away from said seat, said valve gate including a fluid chamber in fluid communication with said cylinder on each side of said piston and having a movable member thereon movable with respect to said gate into and out of seating engagement with said seat, means for supplying a fluid under pressure to said cylinder on one side of said piston to move said piston and said valve gate into said seating position, and means for admitting fluid under pressure from said one side of said piston to said fluid chamber upon said valve gate attaining seating position to engage said member with said seat.

7. A valve of the character described comprising a gate valve having a seat and a valve gate movable into and out of a seating position with respect to said seat, a cylinder, a piston in said cylinder, means connecting said piston to said valve gate to move said gate toward and away from said seat, said valve gate including a fluid chamber in fluid communication with said cylinder on one side of said piston and having a movable member thereon movable with respect to said gate into and out of seating engagement with said seat, means for supplying a fluid under pressure to said cylinder on one side of said piston to move said piston and said valve gate into said seating position, and means operable upon said valve gate attaining seating position for applying fluid pressure to said chamber to move said member into seating position.

8. A valve of the character described comprising a gate valve having a seat and a valve gate movable into and out of a seating position with respect to said seat, a cylinder, a piston in said cylinder, means connecting said piston to said valve gate to move said gate toward and away from said seat, said valve gate including a fluid chamber in fluid communication with said cylinder on one side of said piston and having a movable member thereon movable with respect to said gate into and out of seating engagement with said seat, means for supplying a fluid under pressure to said cylinder on one side of said piston to move said piston and said valve gate into said seating position, and means for admitting fluid to said chamber from said one side of said piston upon the fluid pressure between said cylinder and said one side of said piston attaining a substantially constant value and for releasing fluid from said chamber to one side of said piston upon the fluid pressure in said chamber exceeding that on said one side of said piston.

9. A valve of the character described comprising a gate valve having a seat and a valve gate movable into and out of a seating position with respect to said seat, a cylinder, a piston in said cylinder, means connecting said piston to said valve gate to move said gate toward and away from said seat, said valve gate including a fluid chamber in fluid communication with said cylinder on one side of said piston and having a movable member thereon movable with respect to said gate into and out of seating engagement with said seat, means for supplying a fluid under pressure to said cylinder on one side of said piston to move said piston and said valve gate into said seating position, and means for admitting fluid to said chamber from said one side of said piston at a first rate upon the fluid pressure between said cylinder and piston attaining a substantially constant value and for releasing fluid from said chamber to said one side of said piston upon the fluid pressure in said chamber and on the other side of said piston exceeding that on said one side of said piston and at a rate greater than said first rate.

SAMUEL H. EDWARDS.

REFERENCES CITED

The following references are of record in the file of this patent:

UNITED STATES PATENTS

| Number | Name | Date |
| --- | --- | --- |
| 715,745 | Bickford | Dec. 16, 1902 |
| 1,233,856 | Elder | July 17, 1917 |
| 2,325,802 | Schmidt | Aug. 3, 1943 |